No. 844,802. PATENTED FEB. 19, 1907.
E. HILL.
VALVE FOR CONTROLLING FLUID PRESSURE.
APPLICATION FILED APR. 24, 1906.
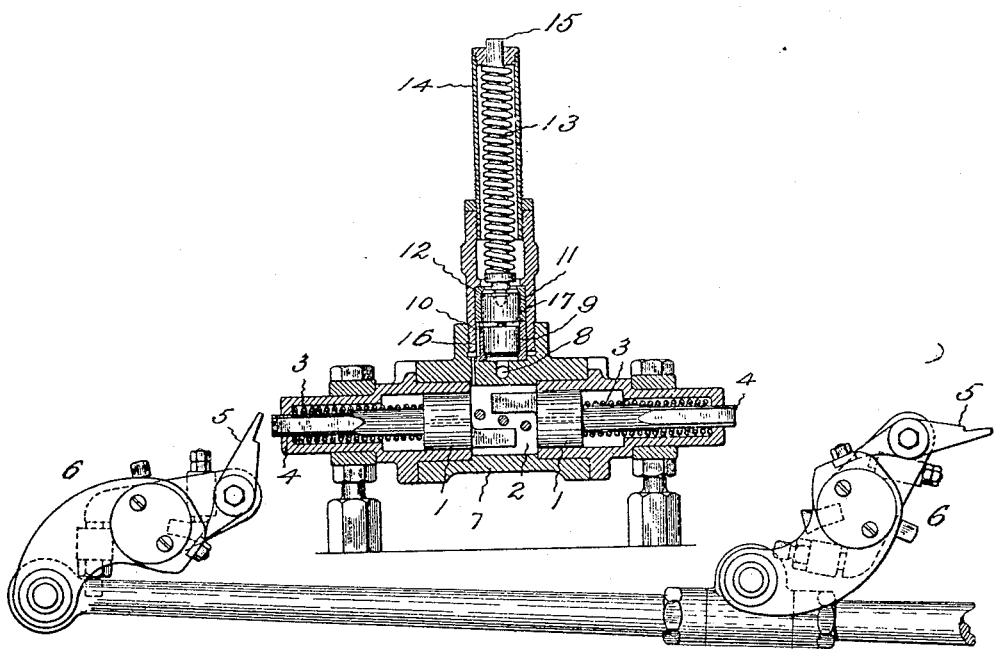
Witnesses.
C. H. Storrs
Ethel M. Lowe
Inventor
Ebenezer Hill
per
Harry P. Williams
Attorney

UNITED STATES PATENT OFFICE.

EBENEZER HILL, OF NORWALK, CONNECTICUT.

VALVE FOR CONTROLLING FLUID-PRESSURE.

No. 844,802.  Specification of Letters Patent.  Patented Feb. 19, 1907.

Application filed April 24, 1906. Serial No. 313,388.

*To all whom it may concern:*

Be it known that I, EBENEZER HILL, a citizen of the United States, residing at Norwalk, in the county of Fairfield and State of Connecticut, have invented a new and useful Valve for Controlling Fluid-Pressure, of which the following is a specification.

This invention relates to a device for affecting the control, application, and withdrawal of compressed air or other fluid under pressure which is to be or has been used to perform desired work.

In air or gas compressors, pumps, and similar machines it is often necessary to regulate the speed by action on the steam-valve, if it is a steam-driven machine, or by action on corresponding controlling devices, if the power is obtained from other sources, or by operating other means which will effect the action of the machine on the air, gas, or water. Such regulating devices are actuated by the fluid-pressure generated by the compressor or pump by having that pressure when it reaches a predetermined point overcome the force of a weight or spring and cause the movement of a weighted or spring-pressed piston which affects the action of the regulating device. One common way is to have the fluid-pressure act directly upon and raise a piston suitably counterbalanced by weight or spring. In this form, as the piston is always subjected to the fluid-pressure, it must be made tight to prevent constant leakage, and consequently it moves with much friction, causing irregularity of action and loss of effective power. Another way is to have a safety-valve set at the predetermined pressure and to utilize the fluid that escapes past the safety-valve for moving the regulating device. The pressure of the escaping fluid in this case is so light, however, that the action of the device depending on it is uncertain and not dependable.

The object of the present invention is to provide a simple, durable, and effective construction which has the advantages of both of the above-mentioned forms and the defects of neither.

The invention consists, essentially, of a valve which is subject to the pressure and controls the flow of the fluid until the pressure reaches the degree predetermined as that at which the fluid is to perform the desired function and a secondary valve which operates in the reverse direction to retain the pressure while the work is being done and at the same time to relieve the pressure-valve from the force of the counterbalance weight or spring in order that the fluid may work at full pressure in the chamber where it is needed, and when the work is accomplished to permit the exhaust of the pressure from the work-chambers.

The invention is illustrated and described herein as applied to an air-compressor relief mechanism of the so-called "unloading" type; but it is to be understood that it is applicable to devices for regulating other apparatus.

The figure of the drawing shows a central vertical section of this controlling-valve arranged with the unloading mechanism of an air-compressor.

The air-compressor unloading device shown has two pistons 1, which at the proper time are moved outwardly by air-pressure in the chamber 2 and retracted by springs 3. When the pistons are moved out, the ends of the piston-rods 4 are in position to be engaged by the latches 5, which connect and render effective the valve-operating mechanism 6, which when these latches are engaged by the piston-rods are disconnected and the valve-operating mechanism temporarily rendered inoperative—that is, inoperative as long as the pistons are forced outwardly. The means for rendering the valves inoperative forms no part of the present invention and is fully described in a prior application for patent. Therefore it is not described more in detail herein.

The fluid under pressure which is to be utilized to cause the operation of the regulating device enters the shell 7 through the inlet 8. In a cylindrical case 9 above the inlet is the loosely-fitting pressure-valve 10, which has its lower end shaped to shut tightly against a seat formed by the contracted lower end of its case. Above this valve in a cylindrical case 11 is a loosely-fitting secondary valve 12. The secondary valve is preferably slightly larger in diameter than the pressure-valve and has its upper end shaped to shut tightly against a seat formed by the restricted upper end of its case. It is desirable for mechanical reasons to have these two valves independent; but they could, if desired, be fastened together or be formed in one piece.

A spring 13 is arranged in the shell 14 in such manner as to press a plunger 15 against the secondary valve. This spring-plunger under normal conditions holds the secondary valve away from its seat and causes the secondary valve to force the pressure-valve against its seat. These two valves are so fitted that the air or other fluid which is to be utilized to perform the desired work can freely pass them when they are opened. A passage 16 connects the chamber 17, in which the valves are located, with the work-chamber 2 between the pistons.

When the fluid-pressure in the inlet below the pressure-valve reaches the predetermined degree and is sufficient to overcome the force of the spring, the pressure-valve is lifted from its seat, and in turn it lifts the secondary valve against its seat. This permits the fluid-pressure to pass upwardly around the pressure-valve and through the passage to the work-chamber between the pistons, which are then forced outwardly in position to interfere with the latches of the valve-operating mechanism. The fluid-pressure which passes by the pressure-valve is exerted against the under side of the secondary valve and holds it closed and causes the secondary valve to hold up the spring, so that the pressure-valve is relieved of all downward force except gravity. As a result of this the pressure-valve offers practically no resistance to the pressure, so that substantially the full force is exerted in the chamber between the pistons. When the fluid-pressure drops to normal, the spring forces the secondary valve down, and that in turn closes the pressure-valve against its seat. Then the pressure which is between the pistons exhausts past the secondary valve and allows the pistons to retract.

This device is very simple and efficient. The valves are so loose that they operate with practically no friction, insuring regularity and uniformity of action, and yet they close tightly, so that there is no leakage, and the full force of the fluid-pressure, when it reaches the predetermined degree and opens the pressure-valve that as soon as it is opened is relieved of the pressure of the spring, is available for effective work.

The invention claimed is—

1. A fluid-controlling device having a pressure-valve that is exposed to the governing pressure and closes against that pressure, a secondary valve arranged to close in a direction opposite to the pressure-valve, and means for forcing the secondary valve toward the pressure-valve and through the secondary valve forcing the pressure-valve to its seat, substantially as specified.

2. A fluid-controlling device having a pressure-valve that closes against the governing pressure and a secondary valve acting in connection therewith, said valves moving toward each other when opening and moving from each other when closing, and means which normally hold the secondary valve open and the pressure-valve closed, substantially as specified.

3. A fluid-controlling device having a pressure-valve that closes against the pressure, means for holding the pressure-valve closed against the pressure, and a secondary valve that is subject to and is closed by the governing pressure when the pressure-valve is open and when closed relieves the pressure-valve of the force of its closing means, substantially as specified.

4. A fluid-controlling device having oppositely-working pressure and secondary valves, each being subject to and acted directly upon by the governing pressure when each is in its closed position, and means which normally hold the pressure-valve closed and the secondary valve open, substantially as specified.

5. A fluid-controlling device having a loose pressure-valve with a seat at one end, a loose secondary valve with a seat at the end opposite from the pressure-valve, said valves moving from each other when closing, and means for normally holding the secondary valve open and through it holding the pressure-valve closed, substantially as specified.

6. A fluid-controlling device having a loose pressure-valve, a secondary valve subject to the governing pressure when the pressure-valve is open, and a spring that normally forces the secondary valve open and against the pressure-valve, but is forced back by pressure on the secondary valve so that the pressure-valve is relieved of all pressure when it is open, substantially as specified.

EBENEZER HILL.

Witnesses:
J. E. SLATER,
S. M. STEVENS.